Feb. 11, 1958  J. E. BERNARD, JR  2,823,074
OXY-ACETYLENE HOSE REEL
Filed Dec. 11, 1956  2 Sheets-Sheet 1

INVENTOR
John E. Bernard, Jr.

BY Mason, Fenwick & Lawrence
ATTORNEYS

Feb. 11, 1958   J. E. BERNARD, JR   2,823,074
OXY-ACETYLENE HOSE REEL
Filed Dec. 11, 1956   2 Sheets-Sheet 2
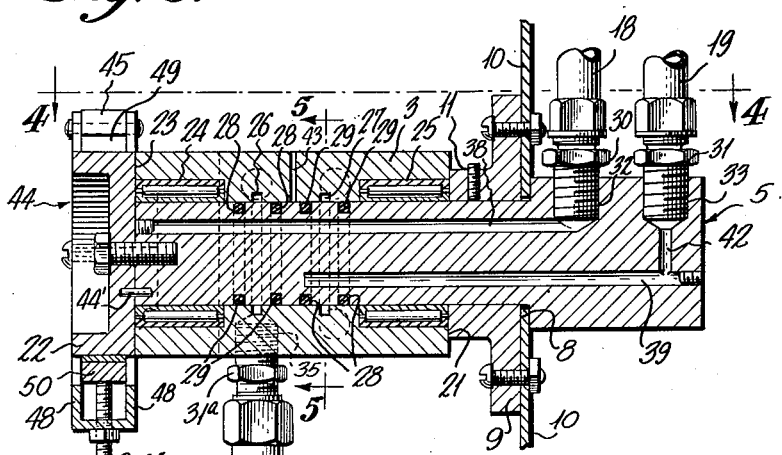
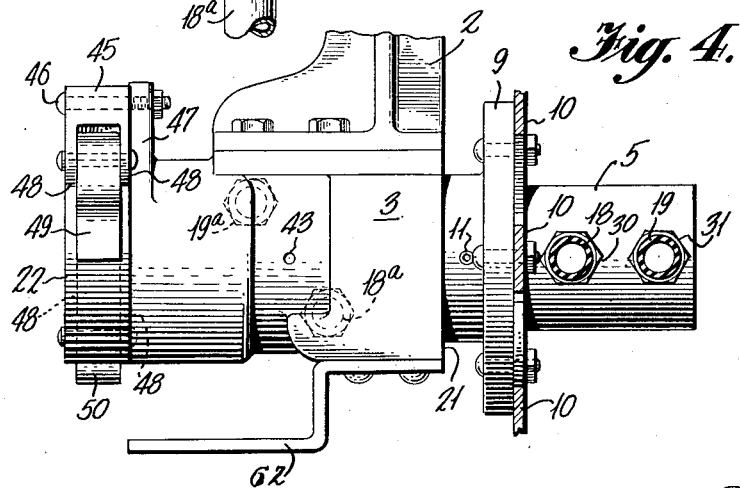
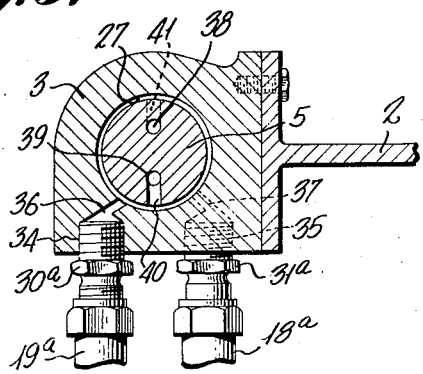
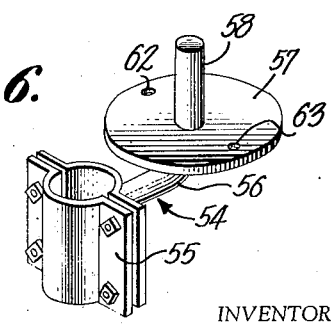
INVENTOR
*John E. Bernard, Jr.*
BY *Mason, Fenwick & Lawrence*
ATTORNEYS

United States Patent Office 2,823,074
Patented Feb. 11, 1958

2,823,074
OXY-ACETYLENE HOSE REEL
John E. Bernard, Jr., Salem, Va.
Application December 11, 1956, Serial No. 627,589
1 Claim. (Cl. 299—78)

This invention relates to an oxy-acetylene hose reel of the type in which the reel has a spindle rotatably fitting within the sleeved portion of the reel support, the sleeved portion having a pair of nipples for connection to hoses leading from respective gas tanks, and the spindle also being provided with a pair of nipples for connection to parallel lengths of hose leading to a torch, the spindle and sleeved torch being formed with suitable conduits for establishing continuous connection between corresponding hoses.

One of the objects of the invention is to provide one of the relatively rotatable interfitting members with spaced circumferential channels opening in the interface between said members, each sealed on both sides, said channels being in communication on the one hand, with the hoses on the gas tank side and on the other hand with the hoses on the torch side, and the provision in one of said members of a bore opening at the interface of said members in the space between said sealed channels and to atmosphere, whereby to prevent leaking gas under pressure from either channel crossing said space and forcing itself into the other channel.

Another object of the invention is the provision of an automatic and adjustable brake for putting a determined frictional damper upon the spindle while the hose is being drawn off from the reel and while the torch is being operated, said brake automatically releasing responsive to the initial winding of the reel.

Still another object of the invention is the provision of a swivel support for mounting the reel upon one of the upright handle bars of the welding cart, whereby the reel may be swung from a compact position inboard with respect to the cart to an outboard position in which it is removed out of obstructive relationship to the removal or replacement of the gas tanks in the cart.

A further object of the invention is to provide an oxy-acetylene hose reel incorporating means for achieving the above, and other objects as will appear.

In the drawing which accompanies and forms a part of the following specification, and throughout the figures of which the same reference characters have been used to denote identical parts:

Figure 3 is a longitudinal sectional view in a plane embracing the axis of the spindle, taken on the line 3—3 of Figure 2;

Figure 4 is a plan view, partly in section, taken along the line 4—4 of Figure 3;

Figure 5 is a cross-section taken along the line 5—5 of Figure 3;

Figure 6 is a perspective view of the swivel mounting, used when the reel is attached to a welding cart.

Figure 1:
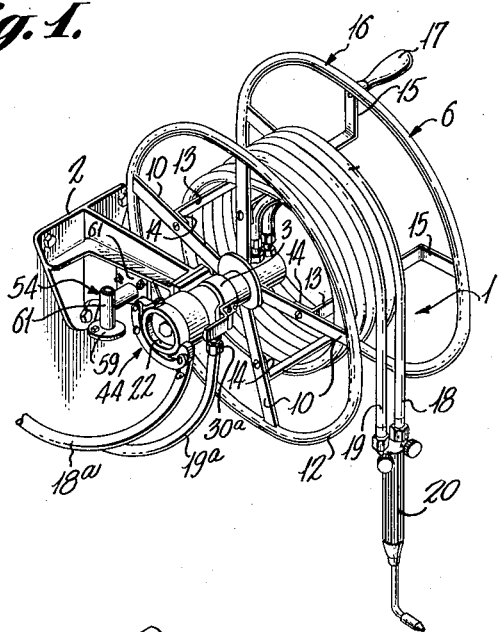
Figure 1 is a perspective view of a hose reel embodying the principles of the present invention.
Figure 2:
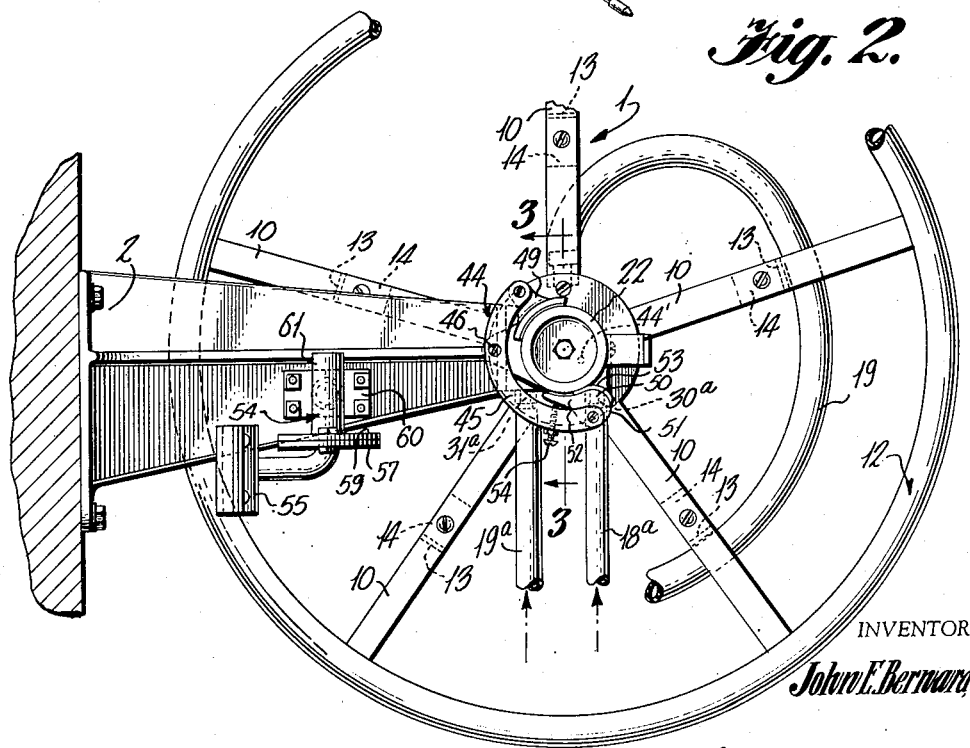
Figure 2 is a side elevation of the hose reel, a portion thereof being broken away.

Referring now in detail to the drawings, the numeral 1, Figures 1 and 2, represents the hose reel as a whole which comprises a support 2, by means of which the reel may be mounted fixedly against a vertical surface. An alternative mounting will be described in due course. The outer end of the support is formed as a housing or sleeve 3 for the spindle 5 of the reel. The reel proper 6, is offset laterally with respect to the housing 3.

As shown in Figure 3, the spindle has an outer end portion of relatively large diameter, the rest of the spindle being of smaller diameter forming in the plane of juncture of the portions of different diameter a shoulder 8. This functions as an abutment for the hub 9 of the inner wheel or head of the reel, the lower ends of the spokes 10 of the wheel intervening. The hub, as shown, is fixed to the spindle by the set screw 11. The outer ends of the spokes 10 are connected to the rim 12, which preferably is of tubular material. The reel drum upon which the torch hoses are wound, consists of transversely arranged bars 13, in number equal to the spokes. The end portions of said bars are bent perpendicular to the intermediate parts, the inwardly directed portions 14 being secured to the spokes 10, while the outwardly directed portions 15 support the rim 16, and which with said rim constitute the outer wheel or header of the drum. A handle 17, fixed to the rim 16 affords means for rotating the reel when winding in the hose 18 and 19 which serve the torch 20.

In Figure 3 it will be noted that the housing 3 abuts the flat adjacent end face 21 of the hub 9, and that the spindle extends from end to end of the housing. A brake drum 22, which is larger in diameter than the adjacent end of the spindle, and the details of which will be described later on, is bolted axially to the end of the spindle and substantially abuts the flat end face 23 of the housing. The spindle is thus restrained from substantial endwise movement by the hub at one side and the brake drum at the other.

The ends of the housing 3 are interiorly circumferentially recessed to receive the cylindrical needle bearings 24 and 25 upon which the spindle rides within the housing. The part of the housing between the needle bearings embraces the corresponding part of the spindle with a free fit. The housing 3 is formed with longitudinally spaced circumferential channels 26 and 27, opening in the inner face thereof, and on each side of both channels the spindle is provided with ring grooves 28, occupied by O-rings 29 which intersect the plane of separation between the housing and spindle, and effectively seal the channels.

A pair of connector nipples 30 and 31 are mounted in parallel threaded bores 32 and 33 in the enlarged end of the spindle which projects outwardly beyond the hub of the inner wheel. A similar pair of nipples 30a and 31a are mounted in parallel threaded bores 34 and 35, preferably in that part of the housing which is the beneath side when the support 2 is wall-mounted, as shown in Figures 2 and 5. These nipples are for connection with the hoses 19a and 18a, which lead to the respective gas tanks, not shown. As shown in Figure 5, the bore 34 has a connection 36 with the channel 27, and the bore 35 is also in communication with the channel 26 by way of a connection 37. The channel 26 is directly behind the channel 27 in Figure 5, and therefore, does not show in this figure.

A pair of longitudinal bores 38 and 39 extend within the spindle. These are connected at one end respectively to the channels 26 and 27 by way of the lateral passages 40 and 41. At their other ends the bore 38 connects to the threaded bore 32, and the bore 39 connects to the threaded bore 33 by way of the lateral passage 42. Thus by virtue of the channels 26 and 27, the tank hoses 18a and 19a are continuously in communication with the corresponding torch hoses 18 and 19 while the reel is being operated, as well as when it is at rest.

Since the gases pass through the respective bores under pressure, there is a definite risk of leakage from end channel 26 or 27, due to wear of the O-rings and perhaps other causes, the gas leaking from one channel forcibly crossing the space between the channels and forcing itself into the other channel. Such leakage may create an explosion hazard by mixing with the gas in the invaded hose. In order to avoid this risk, the housing 3 is provided with a bore 43 open to atmosphere and opening in the interface between the housing and spindle between the adjacent O-rings which are provided to seal adjacent channels. This atmospheric bore keeps the interfacial space at atmospheric pressure so that gas leading from one channel into said space has no force to penetrate the adjacent seal into the other channel.

Since the object of the oxy-acetylene hose reel is to keep hoses off the floor, the brake, represented as a whole by the numeral 44, is provided. This has a retardative effect upon the inertia of the reel when the hoses are pulled out, so that no greater length of hose than necessary is unreeled. The brake comprises the drum 22, which has been previously referred to as being axially bolted to the spindle 3. The dowel 44' between the drum and spindle prevents rotary slippage of the drum about the bolt. A brake arm 45 is correlated with the drum. This arm is preferably, as shown, an arcuate channel shaped member of almost semicircular amplitude, pivoted at an intermediate point 46 to an ear 47, formed on the housing and extending in the direction of the wall support. In other words, the brake arm is at the rear of the brake drum when the latter is wall-mounted. The flanges 48 of the brake arm extend at both ends, forming bifurcations between which a brake shoe 49 is pivotally mounted at the top of said arm, and a brake cam 50 pivotally mounted at the bottom. The brake cam is an eccentric 51 having a tail 52. The tail is curved, being outwardly convex to follow approximately the curvature of the brake arm, and inwardly concave to follow approximately the peripheral curvature of the brake drum. The eccentric is lined with leather or the like, from a point adjacent the base of the tail, approximately to a point at which it is of greatest radius, as shown at 53. The brake shoe also is lined. In the repose position of the brake, the pivoted brake arm is so balanced that the brake shoe rests lightly upon the upper part of the drum, while the lower part of the drum is free from contact with the tail but in light contact with the lining of the eccentric adjacent a point at which the radius of the eccentric is minimum. At the initial rotation of the drum when the hoses are being pulled out, the friction between the drum and lining of the eccentric moves the contact point between drum and eccentric to a higher position on the cam, tilting the brake arm to increase the pressure between the brake shoe and the brake drum, thus dampening the inertia of the reel to the extent that it will not overrun the hose when the desired length of the hose has been pulled out. The degree of friction developed between brake and cam is regulated by the set screw 54, which bears against the tail and determined the maximum high point on the eccentric that can come into contact with the brake drum. This adjustment permits the hose to be unreeled without unnecessary drag, and at the same time prevents the running off of the reel of more hose than is actually drawn out. When the direction of rotation of the reel is reversed, for reeling in the hose, the drum is likewise reversed, the friction between drum and cam turning the latter to a lower radial point on the surface of the eccentric, loosening the contact between the brake shoe and brake drum, permitting the drum to run free in the concavity of the tail of the cam.

As an alternative to the wall support 2, the hose reel is provided with the swivel support 54, shown in Figures 1, 2 and 6. This support is designed to be attached to one of the parallel upright handle members of the conventional welding cart, it not being a part of the present invention, is not shown. Said welding cart is similar to the ordinary hand truck being wheeled, and having means for supporting the oxygen and acetylene tanks side by side and in substantially upright position. Such a truck enables the welding outfit to be trundled to the object being worked upon. The swivel support 54 comprises a clamp 55, by means of which it is secured to one of the handle members, one side of said clamp being provided with a laterally extending bracket 56, formed with a disk 57 which is substantially horizontal when the welding cart is at rest. A post 58 rises from the center of said disk. A complementary disk 59 is rigidly mounted to a side of the fixed support 2 by means of a bracket 60, having the vertical tubular bearing 61. The bore of said tubular bearing extends through the disk 59. The bearing 61 and disk 59 slip over the post 58 so that the part of the swivel support carried by the hose reel is rotatable about the part fixedly mounted on the reel cart. The hose reel may be swung from a position inboard of the welding cart so that the latter can be trundled through a narrow doorway, or swung to an outboard position in which it may be more conveniently operated. The hose reel may be fixed in either of its extreme positions of swing by a bolt and nut connection passed through a hole in the disk 59 and either one or the other of the holes 62 or 53 with which the disk 57 is provided.

The housing 3 is provided with a torch supporting clip 62, which is in a forward position and substantially horizontal either when the reel is wall supported or when supported by the swivel mounting 54 upon a portable cart.

While I have in the above description disclosed a practical embodiment of my invention, it will be understood by those skilled in the art that the specific details of construction and arrangement of parts, as shown and described, are by way of example and not to be construed as limiting the scope of the invention.

What I claim is:

Oxy-acetylene hose reel comprising a spindle and an integral housing therefor in bearing-journal relationship, said spindle having the portion journaled in said housing of uniform diameter throughout its length and extending beyond said housing, terminating in an end portion of larger diameter than said journaled portion, a shoulder being defined at the juncture between said portions of two diameters, a reel having a hub fixedly mounted upon said spindle between said shoulder and the adjacent end of said housing, bearings for said spindle mounted in annular recesses in opposite end zones of said housing, said housing between said bearings slidably fitting said spindle and being formed with a pair of spaced channels opening in the interface between said housing and spindle, said spindle being formed with spaced pairs of ring grooves also opening in said interface, each channel being between the ring grooves of a corresponding pair, O-rings mounted in said grooves sealingly contacting said housing for sealing each channel against leakage, a pair of nipples mounted on said housing adapted to be connected to hoses from the respective supply tanks of oxygen and acetylene gas, bores in said housing connecting said nipples to the respective channels, a second pair of nipples mounted on the enlarged end portion of said spindle adapted to be connected to hoses serving a torch, bores through said spindle connecting said second pair of nipples to the respective channels, whereby access of the two gases to the torch is continuous throughout the unreeling and torch operating phases of the hose reel, said housing being provided with a bore open at one end to atmosphere and having its other end opening in said interface at a point between adjacent O-rings of said pairs for reducing the pressure of gas leaking from either channel into said interface, thereby preventing it forcing itself into the other channel.

References Cited in the file of this patent

UNITED STATES PATENTS

| | | |
|---|---|---|
| 1,577,968 | Hemmingsen | Mar. 23, 1926 |
| 1,851,723 | Neidow | Mar. 29, 1932 |
| 2,071,174 | Parker | Feb. 16, 1937 |
| 2,273,579 | Krieg | Feb. 17, 1942 |
| 2,343,491 | Bard et al. | Mar. 7, 1944 |
| 2,629,630 | Roark | Feb. 24, 1953 |